United States Patent [19]

Noguchi

[11] 4,073,566

[45] Feb. 14, 1978

[54] BEAM SCANNING DEVICE USING A STATIONARY HOLOGRAM

[75] Inventor: Masaru Noguchi, Asaka, Japan

[73] Assignee: Fuji Photo Film Co., Minami-ashigara, Japan

[21] Appl. No.: 610,179

[22] Filed: Sept. 4, 1975

[30] Foreign Application Priority Data

Sept. 4, 1974 Japan .................................. 49-101486

[51] Int. Cl.$^2$ ........................... G02B 5/32; G03H 1/22
[52] U.S. Cl. ..................................... 350/3.71; 350/6.8
[58] Field of Search ...................... 350/6, 7, 3.5, 285; 178/7.6; 346/108

[56] References Cited

U.S. PATENT DOCUMENTS

| 3,750,189 | 7/1973 | Fleischer ..................... 350/7 |
| 3,865,465 | 2/1975 | Tatuoka et al. ................ 350/7 |

OTHER PUBLICATIONS

Sincerbox, IBM Tech. Dis. Bull., vol. 10, No. 3, Aug., 1967, pp. 267-268.

*Primary Examiner*—Jon W. Henry
*Attorney, Agent, or Firm*—Gerald J. Ferguson, Jr.; Joseph J. Baker

[57] ABSTRACT

A laser beam generated from a laser source is passed through a semi-cylindrical lens having a horizontal axis and vertically converged thereby to a horizontal line on a face of a rotating multi-face mirror. The vertically converging light beam is reflected by the face of the mirror and vertically diverges. The vertically diverging light beam impinges on a hologram and the first-order diffraction beam emerging from the hologram converges to a point. As the mirror rotates about the axis of rotation thereof, the point to which the first-order diffraction beam converges repeatedly moves along a line of predetermined length. The hologram has the effect of converging the first-order diffraction beam emerging therefrom when it receives a vertically diverging light beam so that any beam emerging from vertically the same level on the face of the mirror converges to the same point.

6 Claims, 14 Drawing Figures

BEAM SCANNING DEVICE USING A STATIONARY HOLOGRAM

CROSS-REFERENCE TO RELATED APPLICATION

The present invention is closely related to the invention disclosed in the copending U.S. patent application Ser. No. 488,951 now abandoned which was filed on July 16, 1974 by inventors including the inventor of this invention.

BACKGROUND OF THE INVENTION

1. Field of the Invention

This invention relates to a beam scanning device, and more particularly to a device for recording information on a recording medium of small recording area such as a microfilm by scanning the medium with a light beam.

This invention is particularly applicable to a system in which computer output information is to be recorded on a microfilm with high speed and high resolution.

2. Description of the Prior Art

It has been known in the art to use a collimated light beam such as a collimated laser beam in a high speed image recording device in a so-called COM system wherein computer output information is recorded on a microfilm. A laser beam can be advantageously used in recording information in a small area because of the highly collimated and converged small light spot obtained thereby. Further, by producing a small light spot of extremely high energy density by converging the laser beam, it is possible to use recording media of low sensitivity. Because of these advantages which make possible the recording of information on a recording media of low sensitivity with high recording density, laser beam scanning has recently been deemed the most convenient method for recording computer output information.

In the laser beam scanning system, a beam deflector is used to make the beam scan the recording medium. There have been know various kinds of beam deflectors such as beam deflectors utilizing acousto-optical or electro-optical effect and beam deflectors using a rotating multi-face mirror or a vibrating mirror such as a galvanometer. Among these beam deflectors, the beam deflector utilizing acousto-optical or electro-optical effect is disadvantageous because of its large loss of light and low resolution; it, however, is suitable for random access. The beam deflector using a vibrating mirror is disadvantageous in that the image is greatly distorted by the variation in speed of the scanning light spot as it scans different points on the rasters; on the other hand, the driving power source circuit thereof is simple and easily handled when the deflector is driven by a sine wave A.C. voltage source. When the deflector is driven by a rectangular wave voltage, it is difficult to obtain high speed in scanning.

In view of the above observations, beam deflectors using a rotating multi-face mirror are considered to be the best for use in a system for scanning microfilms with a laser beam. There are, however, the following great difficulties in manufacturing this type of beam deflector.

First, faces of the rotating multi-face mirror must be precisely processed to form equal angles therebetween. Errors in the angles between adjacent faces cause displacement of the rasters in the scanning direction.

Second, faces of the multi-face mirror must be precisely processed to be in parallel to each other. Errors in the parallelism of the faces cause displacement of the rasters in the direction perpendicular to the scanning direction and cause irregularity in the pitch of the rasters.

Third, faces of the mirror must be precisely in parallel to the axis of rotation of the rotatable shaft of the motor to which the rotating mirror is mounted. Errors in the parallelism between the faces of the mirror and the axis of rotation cause displacement of the rasters in the direction perpendicular to the scanning direction.

The above described three difficulties relate to the precision required in the process of manufacturing the rotating multi-face mirror and in installation of the mirror to the driving motor. In order to keep processing and installation errors small, a highly precise and accordingly costly manufacturing process is required. Therefore, it is desirable to compensate for these errors by a method other than the method for improving the preciseness in manufacture.

The above mentioned errors deriving from the first difficulty concerning the angles formed between adjacent faces of the multi-face mirror can be comparatively simply corrected by an electric process which uses a part of the deflected beam coming from the multi-face mirror as a synchronizing signal for driving a video signal. The first difficulty is, therefore, not serious. On the other hand, errors deriving from the second and third difficulties cannot be simply corrected. For instance, in order to correct these errors by an electric process, the errors in the parallelism of faces of the mirror must be memorized in a recording medium and the incident angle of the beam impinging on the multi-face mirror changed to cancel the displacement of the rasters by use of a beam deflector driven by a signal from the recording medium. This electric process for correction requires a memory or recording medium for recording errors and a beam deflector for correcting the incident angle of the scanning beam, which complicate the construction of the beam scanning device.

SUMMARY OF THE INVENTION

In light of the above observations and description of the conventional beam scanning device for recording information on a recording medium by use of a laser beam, the primary object of this invention is to provide a beam scanning device for recording information on a recording medium with high speed and high resolution by scanning the medium with a light beam.

Another object of the present invention is to provide a beam scanning device for recording information in a small area of, for example, a microfilm.

Still another object of the present invention is to provide a beam scanning device for recording information on a microfilm by scanning the microfilm with a light beam in the horizontal direction in which the errors in the position of rasters deriving from errors in parallelism of the faces of the multi-face mirror are corrected.

A further object of the present invention is to provide a beam scanning device for recording information on a microfilm by scanning the microfilm with a laser beam through a cylindrical lens element and a hologram plate to correct errors in the vertical position of rasters.

In the beam scanning device in accordance with the present invention, a semi-cylindrical lens is provided between a laser source and a rotating multi-face mirror for converging the laser beam only in the direction of the axis of rotation of the rotating mirror, i.e. in the vertical direction, and a hologram is provided between the rotating mirror and a recording medium for converging the vertically diverging beam reflected by the mirror into a small light spot focused on the recording medium. The effect of the hologram is that a vertically diverging light beam incident thereto is vertically converged thereby and light beams parallel in the horizontal direction and incident thereto are converged to a point thereby. By this effect of the hologram, light beams reflected by the rotating multi-face mirror are always converged to a point on the same level even if the direction of the beam reflected by the faces of the mirror deviate owing to the error in parallelism of the faces. Thus, the errors deriving from said second and third difficulties are perfectly compensated for by the effect of the hologram. Further, this invention is characterized in that the distance between the hologram and the point to which the light beams incident to the hologram are converged thereby is half as long as the distance between the hologram and the reflection face of the rotating mirror, whereby highly accurate beam scanning is performed.

DESCRIPTION OF THE PREFERRED EMBODIMENTS

Figure 1:
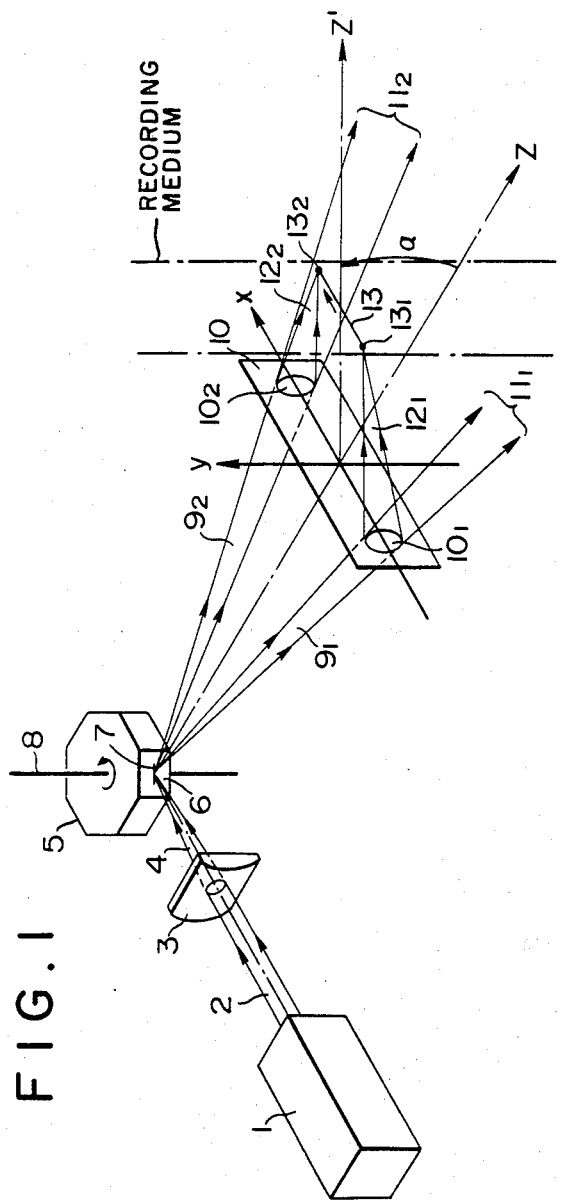
FIG. 1 is a perspective view showing the basic construction of the optical system of the device in accordance with the present invention.

Now, preferred embodiments of this invention will be described in detail with reference to the drawings. As shown in FIG. 1 which illustrates the optical system of the beam scanning device in accordance with an embodiment of the present invention, a collimated light beam 2 emerging from a light source 1 such as a laser oscillator which emits a collimated light beam is vertically converged through a semi-cylindrical lens 3 having a horizontal axis. The vertically converged light beam 4 impinges on the reflecting face 6 of a rotating multi-face mirror 5 to form a linear light source 7 thereon. Since the light beam 2 is converged only in the vertical direction, the linear light source 7 formed on the reflecting face 6 of the mirror 5 is in the shape of a line horizontally oriented as shown in FIG. 1. The multi-face mirror 5 is rotatable about a vertical axis 8. As the rotating multi-face mirror 5 rotates about the axis 8, the light beam 4 reflected by the face 6 is deflected from the position $9_1$ to the position $9_2$ to scan a hologram 10 located in the optical path of the light beam 4 reflected by the face 6. As the light beam 4 is deflected from the position $9_1$ to $9_2$, the light spot on the hologram 10 scans the hologram from the position $10_1$ to $10_2$ in the horizontal direction as indicated by the axis $x$. Each time the face 6 on which the light beam 4 converges changes as the mirror 5 rotates, the reflected beam repeats the scanning from the position $9_1$ to $9_2$. The hologram 10 is located on the plane $x-y$, and the beam scans the hologram 10 from the position $10_1$ to $10_2$ in the direction of the axis $x$ as mentioned above. The axis perpendicular to the plane $x-y$ is defined as the axis $z$ as illustrated in FIG. 1. When the light beam impinges on the hologram 10 at the positions $10_1$ and $10_2$, zero-order diffraction beams $11_1$ and $11_2$ and first-order diffraction beams $12_1$ and $12_2$ emerge from the hologram 10. Since the hologram 10 is made by the method as described hereinafter, the first-order diffraction beams $12_1$ and $12_2$ converge to points $13_1$ and $13_2$. Therefore, as the rotating mirror 5 rotates about the axis 8, the light spot formed by the convergence of the first-order diffraction beam moves from the position $13_1$ to $13_2$ along a straight line 13. The angle formed between the axis $z$ and the direction $z'$ in which the first-order diffraction beams advance is defined as $\alpha$. The angle $\alpha$ is normally selected to be within the range of 5° to 60°. The first-order diffraction beam emerging from the hologram 10 at the intersection of the axes $x$ and $y$ advances in the plane $y-z$ and along the axis $z'$.

The correction of errors in parallelism of faces performed in accordance with the optical system of this invention will now be described in detail with reference to FIG. 2. The light beam 2 emerging from the laser source 1 is converged vertically through the semi-cylindrical lens. The converging light beam 4 forms a linear light source 7, which is indicated as a point in FIG. 2, on the reflecting face 6 of the rotating multi-face mirror and diverges from the light source 7 as indicated with the numeral 9. The diverging light beam 9 impinges on the hologram 10 and makes the first-order diffraction beam 12 emerge from the hologram 10. The first-order diffraction beam 12 emerging from the hologram 10 advances along the axis $z'$ and converges to the point 13.

When the reflecting face 6 is inclined as indicated with the numeral 6', the light beam 9 is deviated as indicated with the numeral 9'. The deviated beam 9' impinging on the hologram 10 makes the first-order diffraction beam 12' advance toward the point 13. More exactly, the first-order diffraction beams 12 and 12' are converged to points $13_1$ and $13_2$ on a line 13 on the plane $x-z'$ which is parallel to the axis $x$. Therefore, even if the faces 6 of the rotating multi-face mirror 5 are not precisely in parallel to each other and the diverging light beam 9 from the face 6 deviates as indicated by 9' when the mirror 5 rotates, the converging light beams 12 and 12' from the hologram 10 always reach the same line 13 and accordingly the light spot finally obtained on the recording medium shown in FIG. 1 does not deviate vertically. Thus, the error in parallelism between the faces 6 of the multi-face mirror 5 is completely corrected on the image recording plane. It will be noted that the hologram 10 must have a size sufficiently large to cover the maximum possible deviation of the diverging light beam 9.

Figure 3:
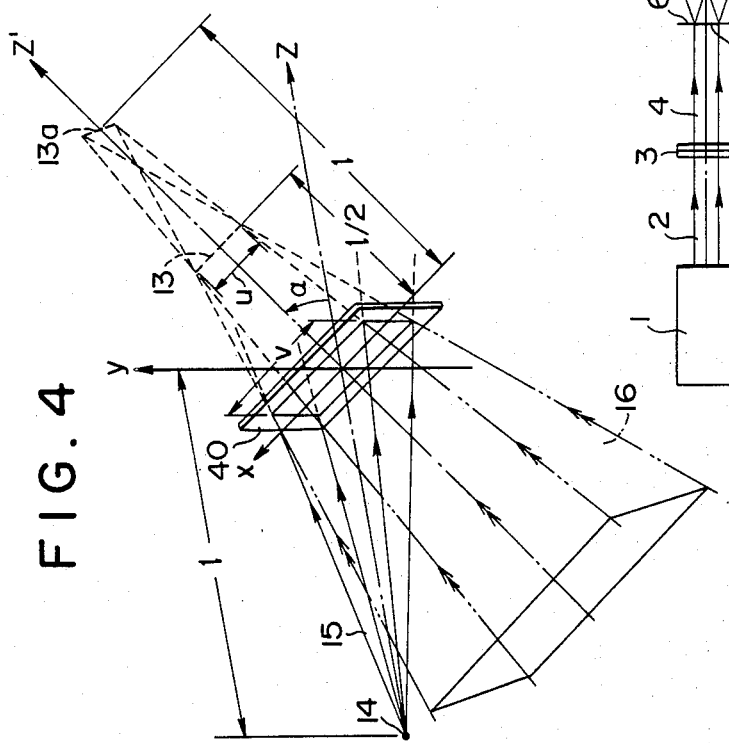
FIG. 3 is a plan view showing the optical system of the device as shown in FIG. 1 with the rotating mirror omitted.

The advancement of the light beams from the laser source 1 to the final converging line 13 will become more apparent from the following description made with reference to FIG. 3 which is the plan view of the optical system of the invention. Referring to FIG. 3, the light beam reflected by the face 6 scans the hologram 10 from the position $10_1$ to $10_2$, and the first-order diffraction beams $12_1$ and $12_2$ emerging from the hologram 10 at the positions $10_1$ and $10_2$ converge to the points $13_1$ and $13_2$ on the straight line 13 which is parallel to the axis $x$. Therefore, as the multi-face mirror 5 rotates about the axis 8 of rotation, the light spot repeatedly scans from the position $13_1$ to $13_2$ along the line 13.

This invention is characterized in that the hologram 10 has a function to make the first diffraction beams $12_1$ and $12_2$ converge to the points $13_1$ and $13_2$ which are at the distance of $l/2$ from the hologram 10 where the distance between the hologram 10 and the face 6 of the rotating mirror 5 is $l$ in order to record information on a recording medium with extremely high resolution.

Figure 4:
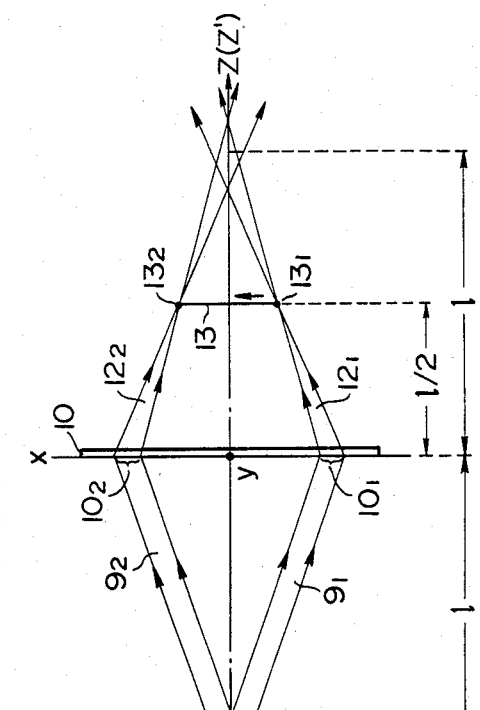
FIG. 4 is a perspective view showing the process of making a hologram to be used in the device of this invention.
Figure 5:
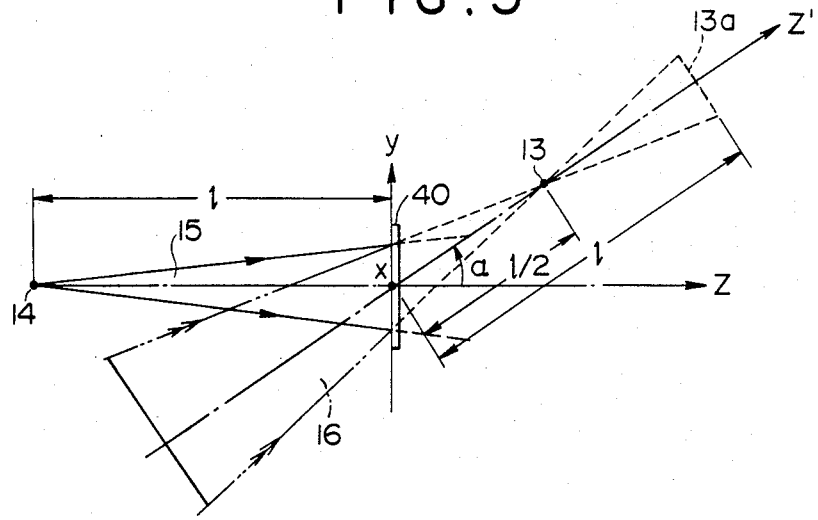
FIG. 5 is a side view showing the hologram making process as shown in FIG. 4.
Figure 6:
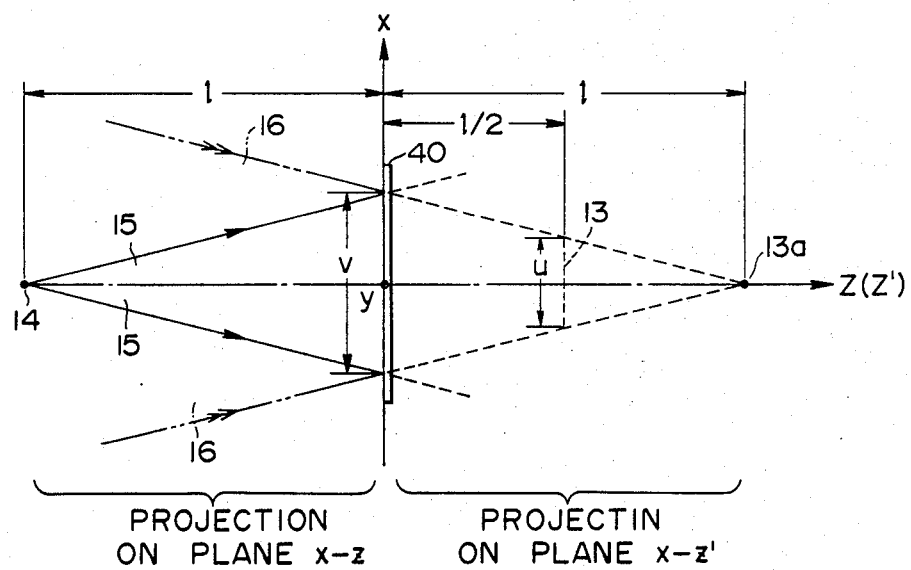
FIG. 6 is a plan view showing the hologram making process as shown in FIG. 4.

The method of making the hologram 10 used in the scanning device in accordance with the present invention as described above which has a function to direct the light beams reflected by the rotating mirror 5 advancing in different directions due to the errors in parallelism of faces 6 of the rotating mirror 5 toward the same line 13 will be described in detail with reference to FIGS. 4 to 6. A spherical wave 15 generated from a monochromatic point light source 14 is incident into a holographic recording medium 40 placed in a plane $x$–$y$. The average direction of advancement of the spherical wave 15 is set to be in the axis $z$. The distance $l$ from the point light source 14 to the holographic recording medium 40 is set to be equal to the distance from the face 6 to the hologram 10 in the information recording process as shown in FIGS. 1 to 3. Together with the spherical wave 15, a vertically and horizontally converging monochromatic light beam 16 (indicated with dot-and-dash lines) advancing in the direction of the axis $z'$ which converges vertically to a line 13 parallel to the axis $x$ located at the distance $l/2$ from the recording medium 40 is incident to the recording medium 40 in the direction of an axis $z'$ which forms an angle $\alpha$ with said axis $z$ in the plane $y$–$z$ as shown in FIG. 5. The angle $\alpha$ formed between the axes $z$ and $z'$ in this hologram making process shown in FIG. 4 is equal to said angle $\alpha$ formed between the axes $z$ and $z'$ in the information recording process as shown in FIG. 1. The vertically and horizontally converging light beam 16 further converges to a line 13$a$ orthogonal to the plane $x$–$z'$ located at the distance $l$ from the recording medium 40. The light beam 16 can easily be obtained by combining two cylindrical lenses. The convergence in the horizontal direction along the line 13 of the vertically converging beam 16 is determined so that the length $u$ of the line 13 may be equal to the length of the finally obtained rasters which is the distance from the point $13_1$ to $13_2$ shown in FIG. 3. The length $v$ of the hologram measured in the direction of the axis $x$ obtained on the recording medium 40 is twice or more as large as the length $u$ of the finally obtained rasters as shown in FIG. 6. The height of the hologram obtained on the recording medium 40 is so determined that the hologram may sufficiently cover all possible vertical deviations of the beam 9 reflected by the face 6 of the rotating mirror 5.

Figure 2:
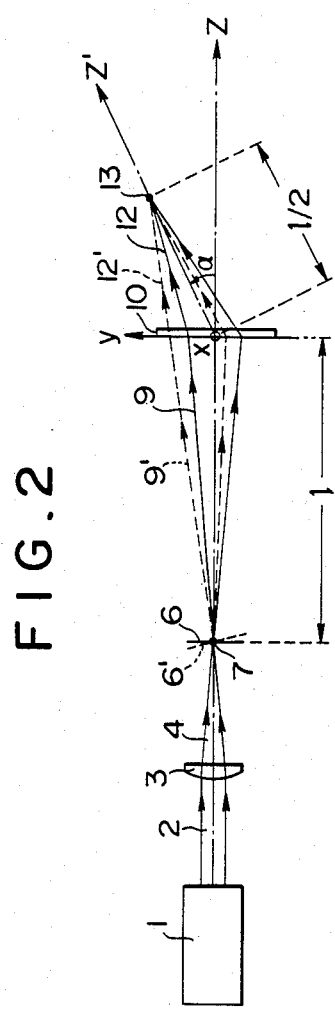
FIG. 2 is a side representation showing the optical system of the device as shown in FIG. 1 with the mirror omitted.

By the spherical wave 15 and the converging beam 16 both impinging on the holographic recording medium 40, a desired holographic interference pattern is recorded on the medium 40 to make a hologram 10 which is to be used in the information recording optical system shown in FIGS. 1 to 3.

Figure 7:
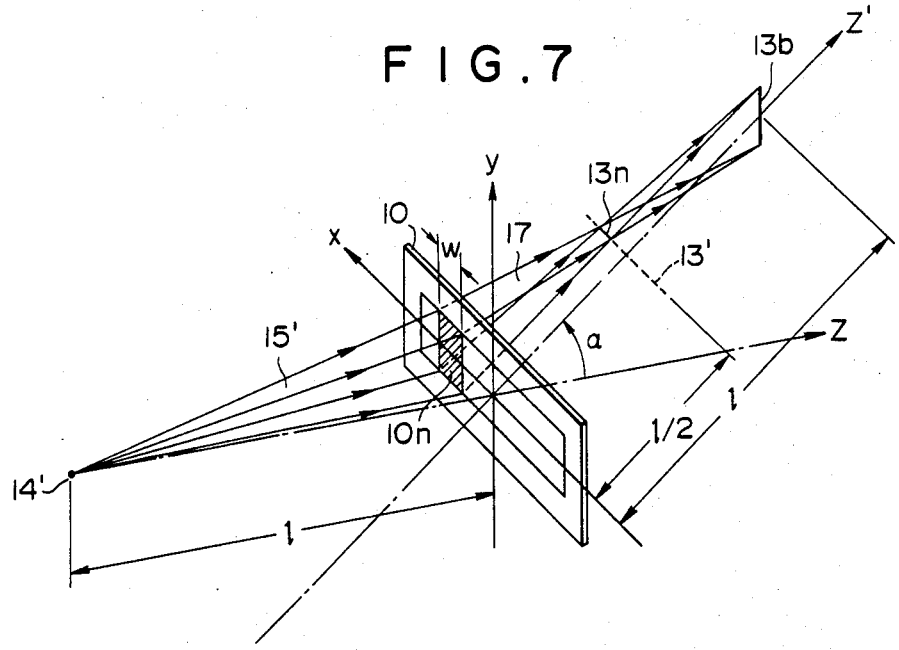
FIG. 7 is a perspective view showing the effect of the hologram with respect to the first-order diffraction beams.
Figure 8:
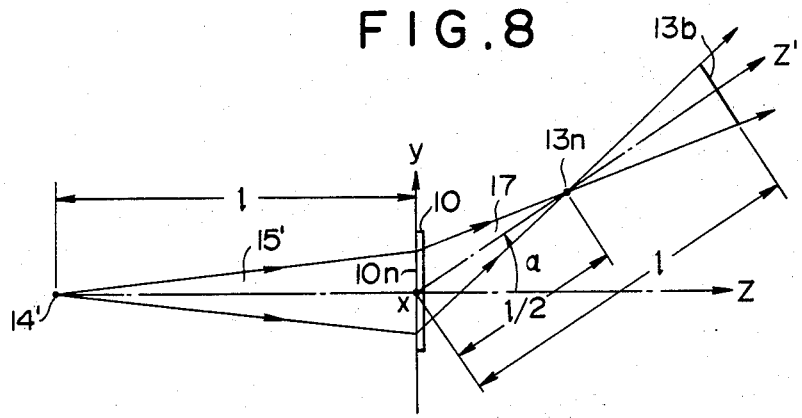
FIG. 8 is a side view showing the effect of the hologram with respect to the first-order diffraction beams.
Figure 9:
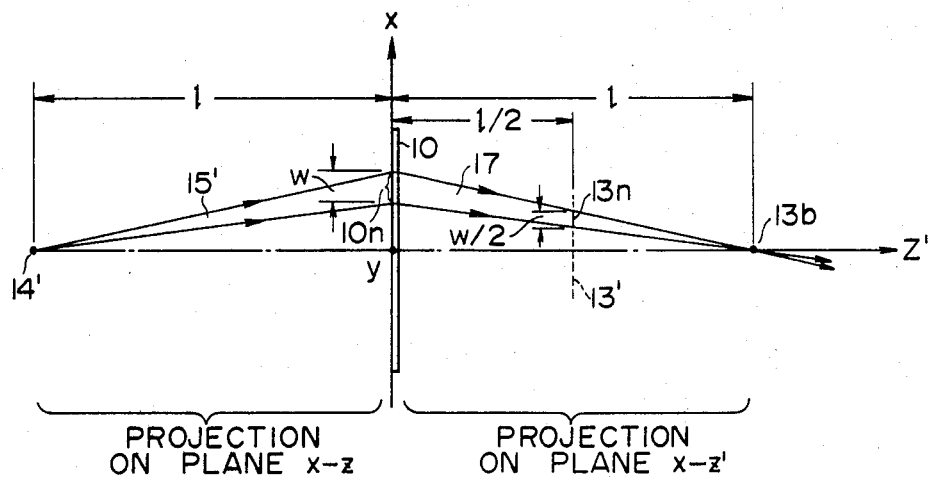
FIG. 9 is a plan view showing the effect of the hologram with respect to the first-order diffraction beams.

The effect of the hologram 10 which is made as described above will be described in detail with reference to FIGS. 7 to 12. When a light beam 15' which is a spherical wave emerging from a point light source 14' is incident to the hologram 10 at the position 10$n$ as shown in FIGS. 7 to 9, a first-order diffraction beam 17 emerges from the hologram 10 at the position 10$n$. When the point light source 14' is located at a position corresponding to the position where said point light source 14 is located in the hologram making process as shown in FIGS. 4 to 6 with respect to the holographic recording medium 40, the first-order diffraction beam 17 converges to form a line image 13$n$ on a line 13' which is in the same position as the line 13 formed by said converging light beam 16 in the hologram making process as shown in FIGS. 4 to 6 and another line 13$b$ at the position equivalent to the line 13$a$ formed by said converging light beam 16. The length of the line 13$b$ is the same as that of the line 13$a$. The distances of these lines 13$n$, 13$a$ from the hologram 10 along the axis $z'$ are $l/2$ and $l$, respectively. The length of the line image 13$n$ is accordingly $w/2$ where $w$ is the width of the hologram portion 10$n$ as shown in FIG. 9.

Figure 10:
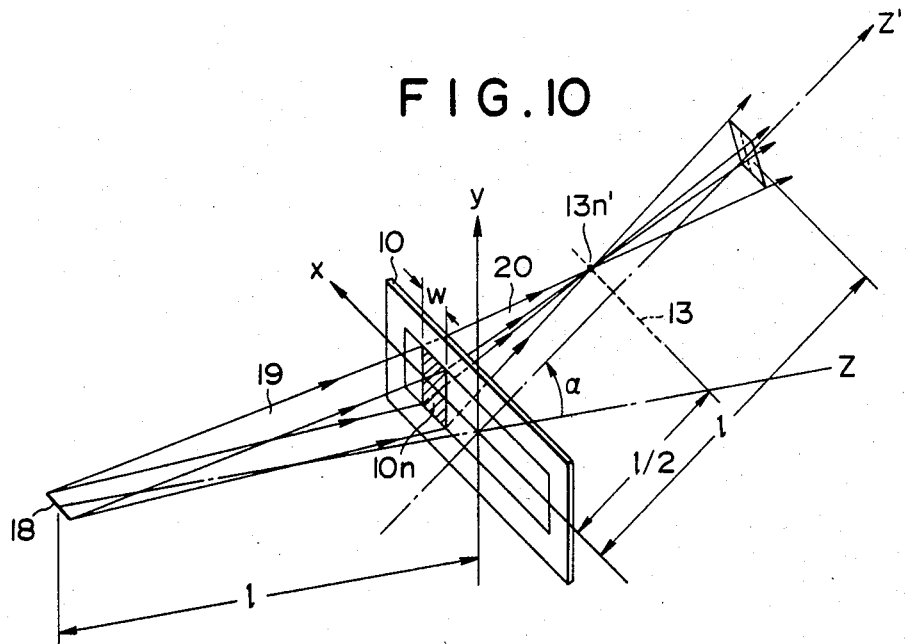
FIG. 10 is a perspective view showing the image forming effect of the hologram with respect to the first-order diffraction beams.

When the light source for supplying a light beam to impinge on the hologram 10 is linear in shape as indicated by 18 in FIG. 10, the first-order diffraction beam 20 emerging from the hologram 10 at the portion 10$n$ which receives the vertically diverging light beam 19 from the light source 18 converges to a point 13$n'$ at the center of the line section 13$n$ on the line 13.

Figure 11:
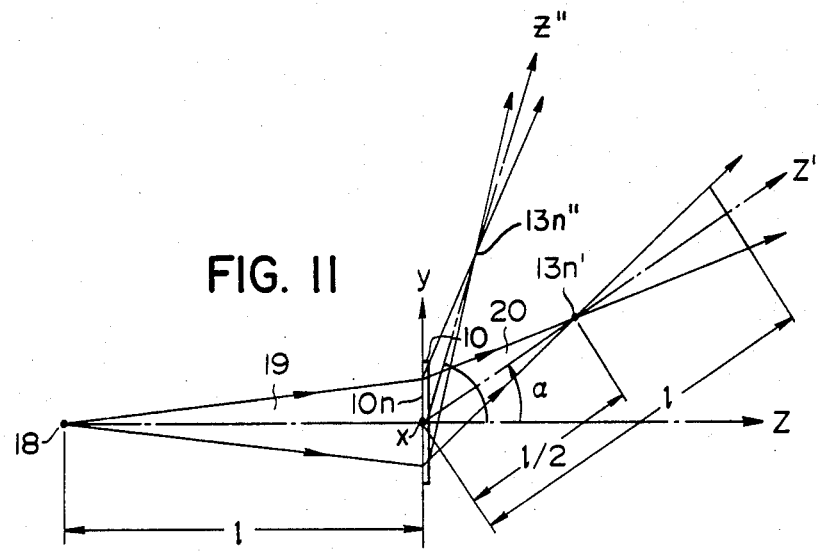
FIG. 11 is a side view showing the image forming effect of the hologram used in this invention in which the first-order diffraction beams are converged.
Figure 12:
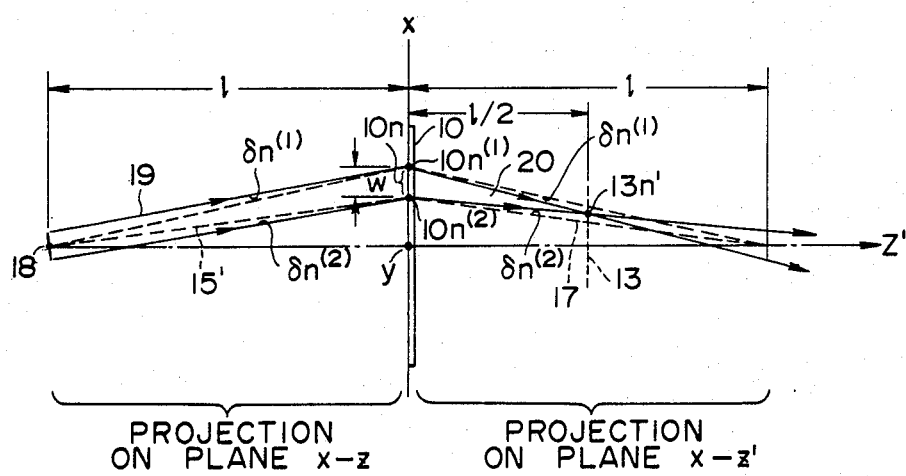
FIG. 12 is a plan view showing the image forming effect of the hologram as shown in FIG. 11.

FIGS. 10 to 12 show the arrangement of elements wherein a hologram 10 is illuminated by a light beam 19 emerging from the linear light source 18 having a length of $w$ located at the position equivalent to the point light source 14' shown in FIGS. 7 to 9 which diverges only in the direction of the axis $y$. FIG. 10 is a perspective view, FIG. 11 is a side view and FIG. 12 is a plan view thereof. When the portion 10$n$ of the hologram 10 is illuminated by the light beam 19 diverging in the direction of the axis $y$, the first-order diffraction beam 20 emerging from the hologram portion 10$n$ forms a point image 13$n'$ on the line where the line image 13 was formed by the light beam 16 in the hologram making process as shown in FIG. 4, which will readily be understood in view of FIGS. 11 and 12. Referring to FIG. 11, the light beam 19 emerging from a point 18 (in the side view) which illuminates the hologram portion 10$n$ is equivalent, in effect, to a spherical wave light beam emerging from a point. Accordingly, the first-order diffraction beam 20 obtained by the hologram portion 10$n$ converges in the direction of the axis $y$ in the same manner as the manner in which the spherical wave light beam 15' emerging from a point light source 14' converges through the hologram portion 10n as shown in FIG. 8. Thus, the diffraction beam 20 converges to a point 13n' at the distance of l/2 from the hologram 10. In the plan view as shown in FIG. 12, the light beam 19 illuminating the hologram portion 10n is substantially a parallel light beam. Therefore, the first-order diffraction beam 20 obtained by the hologram portion 10n does not converge in the direction of the axis x in the same manner as the manner in which the spherical wave light beam 15' emerging from a point light source 14' converges to the point at the distance of l from the hologram 10 through the hologram portion 10n as shown in FIG. 9, but converges to a point 13n' at the distance of l/2 from the hologram 10. As shown in FIG. 12, the incident angle of the parallel light beam 19 is different from that of the diverging light beam 15' by $\delta n(1)$ and $\delta n(2)$ at both ends 10n(1) and 10n(2) of the hologram portion 10n. Accordingly, the angle of diffraction of the first-order diffraction beam 20 is different from that of the diffraction beam 17 by the same angles $\delta n(1)$ and $\delta n(2)$. Thus, the diffraction beam 20 converges to the point 13n' and the beam 17 converges to the point 13b'.

Therefore, by forming a horizontally extending (in the axis x) linear light source 7 on the face 6 of the rotating mirror 5 rotatable about a vertical axis with a vertically converging light beam 19 and directing the light beam 19 reflected by the face 6 of the mirror 5 diverging only vertically to a part 10n of a hologram 10 located at the distance l from the face 6 of the mirror 5, the first-order diffraction beam 20 obtained by the hologram portion 10n scans a straight line 13 parallel to the axis x at the distance of l/2 from the hologram 10 in the direction of the axis z'.

Figure 13:
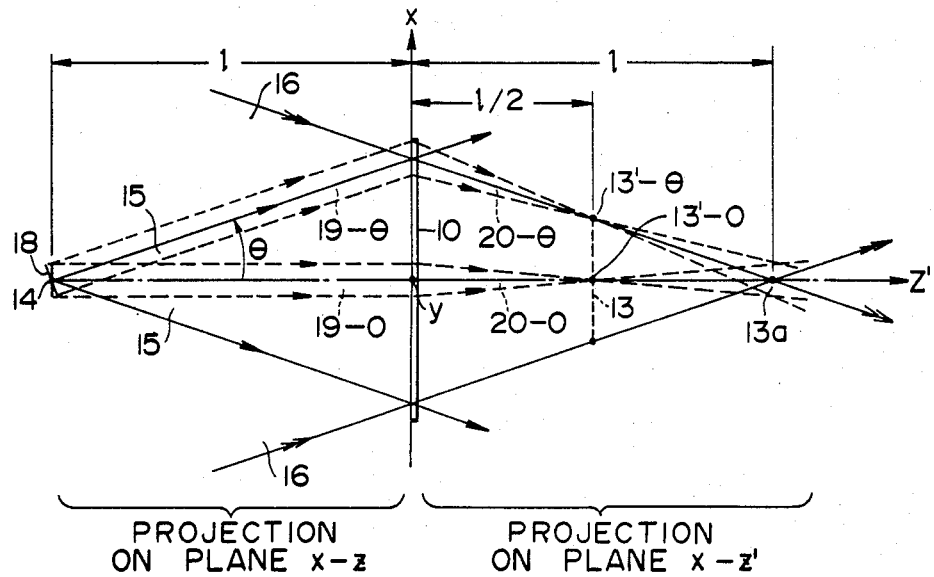
FIG. 13 is a plan view showing the shape of the rasters formed by the optical system of the device in accordance with the present invention.
Figure 14:
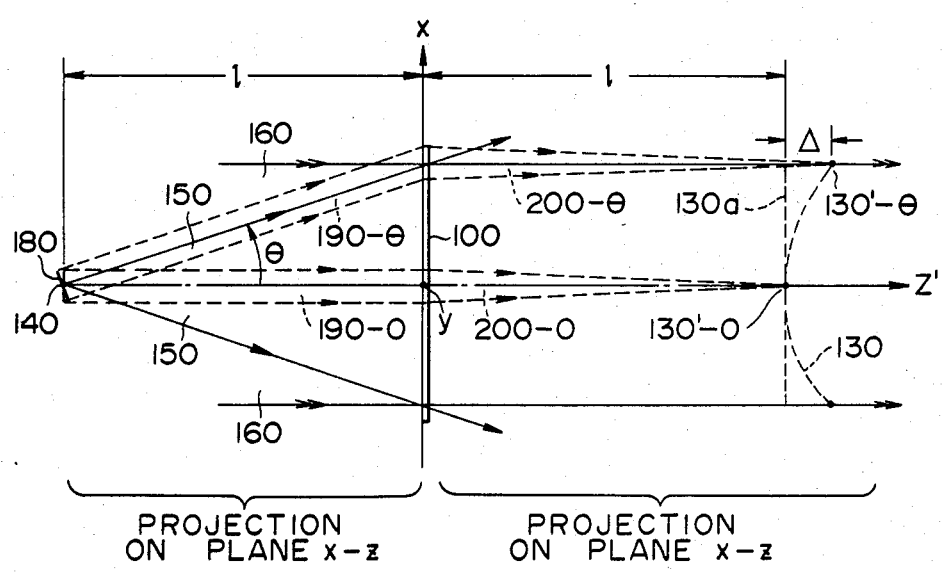
FIG. 14 is a plan view showing the shape of the rasters formed by the optical system in accordance with the invention disclosed in the copending prior patent application.

The advantages of the present invention over the invention disclosed in the copending U.S. patent application Ser. No. 488,951 will become apparent from the following description with reference to FIGS. 13 and 14. FIG. 13 illustrates the optical system of the device in accordance with the present invention which shows that the scanning line 13 is straight. FIG. 14 illustrates the optical system of the device in accordance with the invention disclosed in the copending U.S. patent application Ser. No. 488,951 which shows that the scanning line 130 is curved. In FIGS. 13 and 14, the light beams in the recording process are indicated by solid lines and those in the reconstructing process are indicated by broken lines.

In FIG. 13, a spherical wave light beam 15 emerging from a point light source 14 located at the distance l from the hologram 10 (recording medium) and a converging light beam 16 which converges to a line image 13 parallel to the axis x and perpendicular to the axis z' located at the distance l/2 from the hologram 10 therebehind and to a line image 13a perpendicular both to the axes x and z' located at the distance l from the hologram 10 therebehind are superposed on the hologram 10 to form an interference pattern thereon. Then, the hologram 10 thus produced is located at a position to receive light reflected by the face of a rotating mirror. The rotating mirror receives vertically converging light beam converged to a line 18 on the face of the mirror and reflects the light as a vertically diverging light beam. The light beam reflected by the face of the mirror scans the hologram 10 in the horizontal direction. The light beam reflected by the face of the mirror advancing in parallel to the axis z will hereinbelow be referred to as 19-0 and the same light beam deflected by the angle $\theta$ with respect to the axis z by the mirror will hereinbelow be referred to as 19-$\theta$. The light beams 19-0 and 19-$\theta$ are diffracted by the hologram 10 and first-order diffraction beams 20-0 and 20-$\theta$ are created thereby. The diffraction beams 20-0 and 20-$\theta$ converge to points 13'-0 and 13'-$\theta$ which are on a straight line 13 located at the distance of l/2 from the hologram 10. Therefore, when a recording medium such as a photographic film is placed perpendicular to the axis z' at the distance of l/2 from the hologram 10, an image of high resolution can be recorded thereon by moving the recording medium in the direction of the axis y.

On the other hand, in FIG. 14, a spherical wave light beam 150 emerging from a point light source 140 located at the distance l from the hologram 100 (recording medium) and a vertically converging light beam 160 which converges to a line image 130a parallel to the axis x located at the distance l from the hologram 100 therebehind are superposed on the hologram 100 to form an interference pattern thereon. Then, the hologram 100 thus produced is located at a position to receive light reflected by the face of a rotating mirror. The rotating mirror receives vertically converging light beam converged to a line 180 on the face of the mirror and reflects the light as a vertically diverging light beam. The light beam reflected by the face of the mirror scans the hologram 100 in the horizontal direction. The light beam reflected by the face of the mirror advancing in parallel to the axis z will hereinbelow be referred to as 190-0 and the same light beam reflected by the angle $\theta$ with respect to the axis z by the mirror will hereinbelow be referred to as 19-$\theta$. The light beams 19-0 and 19-$\theta$ are diffracted by the hologram 100 and first-order diffraction beams 200-0 and 200-$\theta$ are created thereby. The diffraction beam 200-0 converges to a point 130'-0 which is on the line 130a located at the distance l from the hologram 100 in the direction of the axis z'. However, the diffraction beam 200-$\theta$ converges to a point 130'-$\theta$ which is not exactly on the line 130a. The distance of the point 130'-$\theta$ from the hologram 100 is $l + \Delta$. For instance, when $l = 50$ and $\theta = 10°$, $\Delta = 2mm$. Therefore, the diffraction beam from the hologram 100 scans along a curved line 130. Consequently, the resolution of the image formed on a recording medium located at the distance l from the hologram 100 is not so high as that of the image formed in accordance with the present invention. In order to obtain images of high resolution in the device as shown in FIG. 14, a curved recording medium must be used.

Thus, in accordance with the present invention, straight rasters are formed, and accordingly, images of high resolution can be obtained.

Although the above described embodiments have been explained only with respect to the first-order diffraction beams, it is possible to use higher-order diffraction beams to make the rasters. For instance, if the first- and second-order diffraction beams are used simultaneously, two rasters 13n' and 13n'' are obtained at one time as indicated along the Z' and Z'' axes of FIG. 11.

As for the light source used in this invention, a laser light source is the most preferable. Other than a laser source, it is possible to use a mercury lamp or a xenon lamp if the light beam emitted by such a light source of high brightness is collimated by use of a pin hole and a lens and filtered through an interference filter.

Further, it will be understood that the present invention is applicable to a beam scanning device which employs a vibrating mirror instead of the rotating multi-face mirror. When the invention is applied to the device employing the vibrating mirror such as a galvanometer, the deviation of the light beam reflected by the mirror caused by the error in parallelism between the axis of rotation and the reflecting face can be corrected by the effect of the hologram used in the present invention. It will also be noted that the present invention is applicable not only to the microfilm image recording device but also to various kinds of image indicating device using a laser beam.

I claim:

1. A light beam scanning device for scanning a surface with a monochromatic light beam for indicating information thereon comprising in combination:

a light source which generates a collimated monochromatic light beam, a scanning mirror which is rotatable or swingable about an axis and located in the optical path of said light beam for reflecting and deflecting a diverging light beam, a converging optical element having one-directional focusing power and located between the light source and the scanning mirror for focusing the light beam generated from the light source only in the direction of said axis and forming a line image on the face of said mirror, a hologram located between the scanning mirror and said surface in the optical path of the diverging light beam reflected by the face of said scanning mirror, said hologram formed using (a) a spherical wave emerging from a point source removed from the hologram a distance equal to the distance between said hologram and the face of said scanning mirror which reflects said light beam and (b) a converging beam which (1) advances toward the hologram, (2) converges toward a first line disposed on a farther side of said hologram opposite from the side at which the source of said converging beam is disposed, said first line being removed from said hologram a distance which is half of the distance between the reflecting face of the scanning mirror and the hologram and being oriented perpendicular to said axis and to the direction of general advancement of said converging beam, and (3) converges along a second line disposed on said farther side of said hologram and being removed from said hologram a distance which is equal to the distance between the reflecting face of the scanning mirror and the hologram and being oriented in the direction of said axis and perpendicular to the direction of general advancement of said converging beam, said hologram converging a higher order diffraction beam emerging from said hologram to a point at said surface where said higher order diffraction beam is of an order higher than the zero-order diffraction beam, said point moving along a straight line parallel to said hologram on said surface as the diverging light beam scans the hologram in one direction, said hologram and said surface are so disposed with respect to one another that the distance from the hologram to said straight line is substantially half as long as the distance from the hologram to the scanning mirror face.

2. A light beam scanning device as claimed in claim 1 wherein said light source is a laser source.

3. A light beam scanning device as claimed in claim 1 wherein said scanning mirror is a rotating multi-face mirror and said converging optical element is a semicylindrical lens whose direction of focusing power is parallel to the axis of rotation of the rotating multi-face mirror.

4. A device as in claim 1 where the average direction of advancement of said spherical wave is in a first direction perpendicular to said hologram and the axis of said converging beam is disposed at a predetermined angle, $\alpha$, with respect to said first direction and where said single line on said surface is disposed at said angle $\alpha$ with respect to said first direction.

5. A device as in claim 1 where said surface comprises a recording medium.

6. A device as in claim 1 including means for converging a plurality of higher order diffraction beams to a respective plurality of points.

* * * * *